US012781927B2

(12) United States Patent
Paul et al.

(10) Patent No.: US 12,781,927 B2
(45) Date of Patent: Nov. 3, 2026

(54) LIGHT FIXTURE CONTROL MODULE

(71) Applicants: TE Connectivity Solutions GmbH, Schaffhausen (CH); Tyco Electronics UK Ltd, Swindon (GB)

(72) Inventors: Randall Bobby Paul, Elizabethville, PA (US); Matthew Edward Mostoller, Hummelstown, PA (US); Jonathan Catchpole, West Hanney (GB)

(73) Assignees: TE Connectivity Solutions GmbH, Schaffhausen (CH); Tyco Electronics UK Ltd., Swindon (GB)

( * ) Notice: Subject to any disclaimer, the term of this patent is extended or adjusted under 35 U.S.C. 154(b) by 109 days.

(21) Appl. No.: 18/627,808

(22) Filed: Apr. 5, 2024

(65) Prior Publication Data

US 2024/0384845 A1 Nov. 21, 2024

Related U.S. Application Data

(60) Provisional application No. 63/503,285, filed on May 19, 2023.

(51) Int. Cl.
*F21V 21/00* (2006.01)
*F21S 8/08* (2006.01)
*F21V 21/108* (2006.01)
*F21V 21/26* (2006.01)
(Continued)

(52) U.S. Cl.
CPC ............ *F21S 8/085* (2013.01); *F21V 21/108* (2013.01); *F21V 21/26* (2013.01); *F21V 23/001* (2013.01); *F21W 2131/103* (2013.01)

(58) Field of Classification Search
None
See application file for complete search history.

(56) References Cited

U.S. PATENT DOCUMENTS 2,210,487 A * 8/1940 Kimmich ................ H01R 9/24 439/712
10,107,480 B1 * 10/2018 Ladewig ................ F21S 8/036
(Continued)

FOREIGN PATENT DOCUMENTS

DE 202020100914 U1 3/2020
DE 202023101614 U1 4/2020
(Continued)

OTHER PUBLICATIONS

European Search Report, European App. No. 24175485 International Filing Date Nov. 11, 2024.

*Primary Examiner* — Steven M Marsh

(57) ABSTRACT

A light fixture control module includes a base including an inner end and an outer end. The inner end is mounted to a vertical mounting base of a light fixture. The base includes a wire channel. The light fixture control module includes a bracket coupled to the outer end of the base. The bracket includes a shell that has an inner chamber. The light fixture control module includes a sensor mounted to the shell of the bracket. The sensor has a sensor element and a sensor wire transmitting a control signal from the sensor element. The sensor wire is routed through the inner chamber of the shell to the wire channel of the base. The sensor wire is configured to be routed away from the base to control operation of a light element of the light fixture.

28 Claims, 11 Drawing Sheets

(51) Int. Cl.
*F21V 23/00* (2015.01)
*F21W 131/103* (2006.01)

(56) References Cited

U.S. PATENT DOCUMENTS

| | | | | |
|---|---|---|---|---|
| 2008/0084656 | A1* | 4/2008 | Sloan | H02G 3/00 361/601 |
| 2014/0328070 | A1* | 11/2014 | Oquendo, Jr. | F21V 21/116 362/427 |
| 2015/0354766 | A1* | 12/2015 | Townsend, Jr. | E01F 9/658 248/220.22 |
| 2016/0109079 | A1* | 4/2016 | McKinley | F21S 8/085 362/89 |
| 2016/0281967 | A1 | 9/2016 | Hunt, III et al. | |
| 2017/0307192 | A1* | 10/2017 | LaFemina | E04H 12/24 |
| 2021/0185786 | A1* | 6/2021 | Bennette | H05B 47/16 |
| 2022/0082242 | A1* | 3/2022 | McDonald | F21S 9/037 |

FOREIGN PATENT DOCUMENTS

| | | | |
|---|---|---|---|
| DE | 202021103612 | U1 | 7/2021 |
| KR | 101803323 | B1 | 12/2017 |

* cited by examiner

LIGHT FIXTURE CONTROL MODULE

CROSS REFERENCE TO RELATED APPLICATIONS

This application claims benefit to U.S. Provisional Application No. 63/503,285, filed 19-May-2023, titled "LIGHT FIXTURE CONTROL MODULE", the subject matter of which is herein incorporated by reference in its entirety.

BACKGROUND OF THE INVENTION

The subject matter herein relates generally to light fixtures.

Light fixtures are used to illuminate areas, such as sidewalks, streets, parking lots, buildings, or other areas. The light fixtures are mounted to a mounting base, such as a pole or a plate on a side of a building. Some light poles includes a vertical section and a horizontal section. The horizontal section provides a surface or area for supporting a control module having a sensor for controlling the light fixture. However, some light poles only include a vertical pole, which does not include a convenient surface for mounting a control module.

A need remains for a device for mounting a light fixture control module to a horizontal mounting base of a light fixture.

BRIEF DESCRIPTION OF THE INVENTION

In one embodiment, a light fixture control module is provided and includes a base including an inner end and an outer end. The inner end is mounted to a vertical mounting base of a light fixture. The base includes a wire channel. The light fixture control module includes a bracket coupled to the outer end of the base. The bracket includes a shell that has an inner chamber. The light fixture control module includes a sensor mounted to the shell of the bracket. The sensor has a sensor element and a sensor wire transmitting a control signal from the sensor element. The sensor wire is routed through the inner chamber of the shell to the wire channel of the base. The sensor wire is configured to be routed away from the base to control operation of a light element of the light fixture.

In another embodiment, a light fixture control module is provided and includes a base including an inner end and an outer end. The inner end is mounted to a vertical mounting base of a light fixture. The base includes a wire channel. The light fixture control module includes a bracket coupled to the outer end of the base. The bracket includes a shell that has an inner chamber. The bracket includes a first mounting surface and a second mounting surface. The light fixture control module includes a first sensor mounted to the first mounting surface of the shell. The first sensor has a first sensor element and a first sensor wire transmitting a first control signal from the first sensor element. The first sensor wire is routed through the inner chamber of the shell to the wire channel of the base. The first sensor wire is configured to be routed away from the base to control operation of a light element of the light fixture. The light fixture control module includes a second sensor mounted to the second mounting surface of the shell. The second sensor has a second sensor element and a second sensor wire transmitting a second control signal from the second sensor element. The second sensor wire is routed through the inner chamber of the shell to the wire channel of the base. The second sensor wire is configured to be routed away from the base to control operation of a light element of the light fixture.

In a further embodiment, a light fixture control module is provided and includes a base including an inner end and an outer end. The inner end is mounted to a vertical mounting base of a light fixture. The base includes a wire channel. The light fixture control module includes a bracket pivotably coupled to the outer end of the base. The bracket includes a shell that has an inner chamber. The bracket includes a securing member configured to be coupled to the base at different mounting positions to control a mounting orientation of the bracket relative to the base at one of various different mounting orientations corresponding to the different mounting positions. The light fixture control module includes a sensor mounted to the shell of the bracket. The sensor has a sensor element and a sensor wire transmitting a control signal from the sensor element. The sensor wire is routed through the inner chamber of the shell to the wire channel of the base. The sensor wire is configured to be routed away from the base to control operation of a light element of the light fixture.

DETAILED DESCRIPTION OF THE INVENTION

Figure 1:
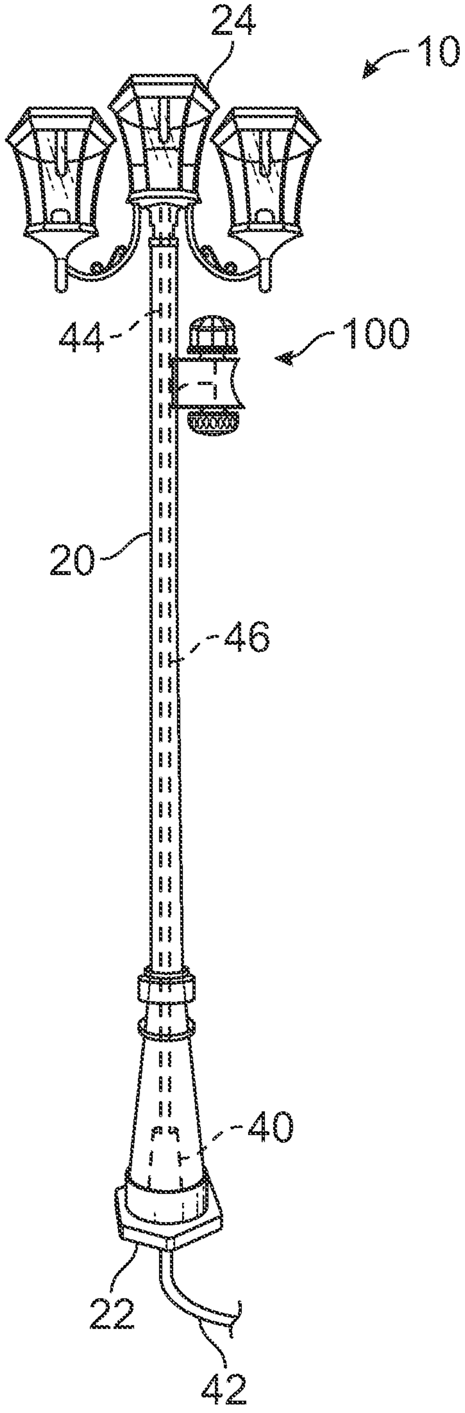
FIG. 1 illustrates a light fixture control module in accordance with an exemplary embodiment for controlling a light fixture.

FIG. 1 illustrates a light fixture control module 100 in accordance with an exemplary embodiment for controlling a light fixture 10. The light fixture control module 100 provides smart control of the light fixture 10. The light fixture control module 100 is mounted to the light fixture 10 to provide external control for the light fixture 10. The light fixture control module 100 is removable and replaceable. Components of the light fixture control module 100 are removable and replaceable, such as to repair or upgrade the light fixture control module 100. The light fixture control module 100 is modular in design to allow connection of different types of control options for the light fixture 10.

The light fixture 10 includes a pole 20 and one or more light elements 30 at the top of the pole 20. The pole 20 extend vertically between a base 22 at the bottom and a tip 24 at the top. The base 22 may be mounted to the ground. The light elements 30 are provided at or near the tip 24 of the pole 20. The pole 20 may include multiple sections between the bottom and the top of the pole 20. The light fixture control module 100 may be mounted to any of the sections of the pole 20. In the illustrated embodiment, the light fixture control module 100 is mounted to the pole 20 near the top of the pole 20. In various embodiments, the pole 20 may be generally cylindrical. Optionally, the pole 20 may be fluted. In various embodiments, the pole 20 may be tapered between the bottom and the top. For example, the bottom section may be larger (for example, larger diameter) in the top section may be smaller (for example, smaller diameter). Optionally, the wall of each section may be tapered. Alternatively, each section may be cylindrical, but have reduced diameters from the bottom to the top. The pole 20 may have decorative features along the pole 20 and/or at the tip 24 to support the light elements 30.

The light fixture 10 includes a control panel 40 (shown in phantom) which may be located in the interior of the pole 20 and accessed through an access panel (not shown). The control panel 40 controls operation of the light elements 30. For example, the control panel 40 may turn the light elements on and off. The control panel 40 may control a dimming function of the light elements 30. Power wires 42 are routed into the interior of the pole 20. The power wires 42 may be terminated to the control panel 40. Fixture wires 44 may extend from the control panel 40 to the light elements 30 to supply power to the light elements 30. In an exemplary embodiment, sensor wires 46 are routed through the hollow interior of the pole 20 between the light fixture control module 100 and the control panel 40. The sensor wires 46 send signals from the light fixture control module 100 to the control panel 40 to control operation of the light fixture 10. For example, the sensor wires 46 may send photo signals from a photosensor of the light fixture control module 100 to turn the light elements 30 on or off at dusk and dawn based on the light levels in the environment around the light fixture 10. The sensor wires 46 may send motion signals from a motion detector of the light fixture control module 100 to increase the light output of the light elements 30 when motion is detected. Other types of sensors at the light fixture control module may send other types of signals for other control schemes.

While the light fixture 10 is shown as a freestanding lamp, the light fixture control module 100 may be used with other types of light fixtures in alternative embodiments. For example, the light fixture control module 100 may be used with light fixtures mounted to a building. For example, the light fixture control module 100 may be mounted to a mounting plate or other structure on the side of the building at the light fixture to control such light fixture.

Figure 2:
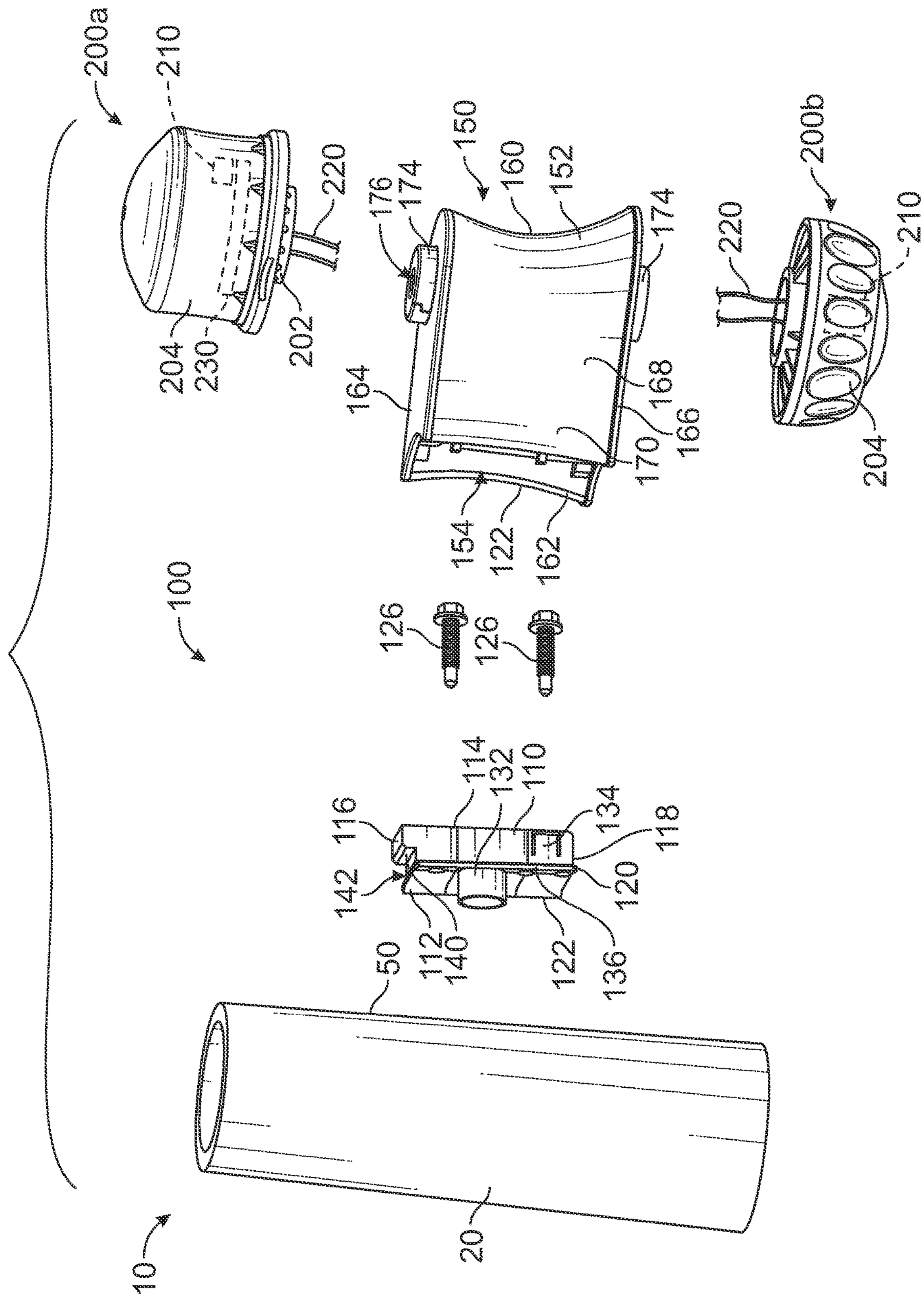
FIG. 2 is a rear perspective, exploded view of the light fixture control module in accordance with an exemplary embodiment configured to be mounted to a vertical mounting base of the light fixture.
Figure 3:
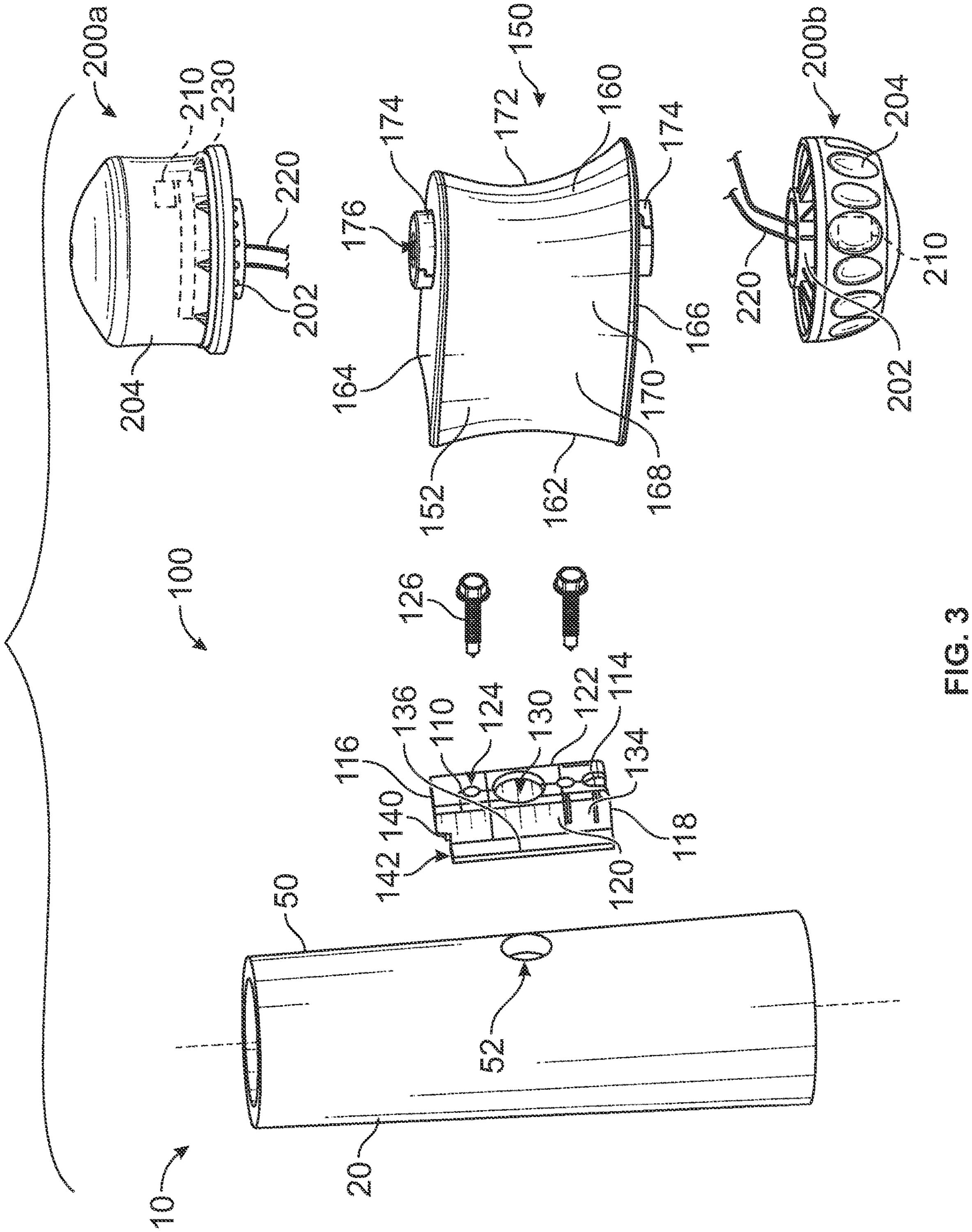
FIG. 3 is a front perspective, exploded view of the light fixture control module in accordance with an exemplary embodiment configured to be mounted to the vertical mounting base of the light fixture.

FIG. 2 is a rear perspective, exploded view of the light fixture control module 100 in accordance with an exemplary embodiment configured to be mounted to a vertical mounting base 50 of the light fixture 10. FIG. 3 is a front perspective, exploded view of the light fixture control module 100 in accordance with an exemplary embodiment configured to be mounted to the vertical mounting base 50 of the light fixture 10. In the illustrated embodiment, the vertical mounting base 50 is a portion of the pole 20 of the light fixture 10. The light fixture control module 100 may be mounted to other types of vertical mounting bases in alternative embodiments.

In an exemplary embodiment, the light fixture control module 100 includes a base 110 and a bracket 150 separate from the base 110 and configured to be mounted to the base 110. The base 110 is configured to be mounted directly to the vertical mounting base 50. The bracket 150 may surround and hide the base 110 from view. The bracket 150 is used to support one or more sensors 200, which are used to control the light fixture 10. Optionally, the base 110 may be a universal component configured to receive various different brackets 150 having different sensor configurations. For example, the base 110 may be used to support the dual sensor bracket illustrated in FIGS. 2 and 3. The base 110 may be used to support a top sensor bracket having a single sensor at the top of the bracket or a bottom sensor bracket having a single sensor at the bottom of the bracket. The base 110 may be used to support other types of brackets, such as sides sensor brackets having the sensors 200 at one or more sides of the bracket or a front sensor bracket having the sensor at the front of the bracket. The base 110 may be used to support brackets having the same or similar mounting interfaces but having different overall sizes or shapes. For example, various brackets may be designed having different decorative shapes or features to correspond to the style of the pole 20.

In an exemplary embodiment, the base 110 is a molded plastic part. However, other types of bases may be used in alternative embodiments, such as a formed metal base. The base 110 includes an inner end 112 and an outer end 114. The inner end 112 faces the vertical mounting base 50. Optionally, the inner end 112 may be sealed to the vertical mounting base 50. The base 110 extends between a top 116 and a bottom 118. The base 110 includes opposite sides 120, 122 extending between the top 116 and the bottom 118. Optionally, the base 110 may be generally box shaped. However, the base 110 may have other shapes in alternative embodiments. In an exemplary embodiment, the inner end 112 may be curved, such as to generally match curvature of the vertical mounting base 50 (for example, the pole 20).

The base 110 includes one or more openings 124 that receive mounting elements 126 used to mount the base 110 to the vertical mounting base 50. In the illustrated embodiment, the mounting elements 126 are threaded fasteners configured to be threadably coupled to the vertical mounting base 50. For example, the threaded fasteners may be self tapping screws. Other types of mounting elements may be used in alternative embodiments. For example, the mounting elements may be straps or bands used to wrap around the outside of the vertical mounting base 50 rather than screw into the vertical mounting base 50.

In an exemplary embodiment, the base 110 includes a wire channel 130 extending through the base 110. The wire channel 130 is configured to receive one or more wires, such as from the sensors 200. In various embodiments, the wire channel 130 passes through the base 110 from the outer end 114 to the inner end 112, such as to allow routing of the wires into the hollow interior of the pole 20. In other embodiments, the wire channel 130 may extend into another portion of the base 110, such as to the bottom 118 to allow the wires to exit to the exterior of the base 110. In an exemplary embodiment, the base 110 includes a grommet 132 extending from the inner end 112. The wire channel 130 passes through the grommet 132. The grommet 132 is configured to be plugged into an opening 52 in the vertical mounting base 50. The grommet 132 directs the wires through the opening 52, such as into the hollow interior of the pole 20. The grommet 132 may protect the wires from the sharp edge of the vertical mounting base 50 at the opening 52. Optionally, the grommet 132 may be sealed to the vertical mounting base 50.

In an exemplary embodiment, the base 110 includes latching features 134 configured to be latchably coupled to the bracket 150. In the illustrated embodiment, the latching features 134 are deflectable latches. In other various embodiments, the latching features 134 may be catches configured to be connected to corresponding deflectable latches of the bracket 150. In the illustrated embodiment, the latching features 134 are located along the sides 120, 122, such as proximate to the bottom 118. Other locations are possible in alternative embodiments. Other types of securing means may be used in alternative embodiments to secure the bracket 150 to the base 110.

In an exemplary embodiment, the base 110 includes one or more mounting flanges 136 configured to be mounted to the vertical mounting base 50. In the illustrated embodiment, the mounting flanges 136 extend along the sides 120, 122. The mounting flanges 136 are provided at the inner end 112 to interface with the vertical mounting base 50. In an exemplary embodiment, the mounting flanges 136 may be deflectable to change shape and to conform to the vertical mounting base 50 when mounted thereto. For example, the mounting flanges 136 may be flexed outward when the mounting elements 126 secure the base 110 to the vertical mounting base 50. The mounting flanges 136 allows mounting of the base 110 to different sized and shaped poles 20. For example, the mounting flanges 136 allows mounting of the base 110 to poles 20 having different diameters by conforming to the different radius of curvature of the different poles 20.

In an exemplary embodiment, the base 110 includes a retention shoulder 140 forming a pocket 142. In the illustrated embodiment, the retention shoulder 140 is located at the top 116 of the base 110. The retention shoulder 140 is located outward of the pocket 142. For example, the pocket 142 is located between the retention shoulder 140 and the inner end 112. The pocket 142 is configured to receive a portion of the bracket 150. For example, a portion of the bracket 150 may be loaded into the pocket 142 from above. The retention shoulder 140 retains the bracket 150 in the pocket 142.

The bracket 150 is configured to be coupled to the outer end 114 of the base 110. The bracket 150 includes a shell 152 having an inner chamber 154. The bracket 150 is plugged onto the base 110 such that the base 110 is received in the inner chamber 154. In an exemplary embodiment, the bracket 150 is a molded plastic part. However, the bracket 150 may be manufactured from different materials or manufactured by different processes in alternative embodiments. For example, the bracket 150 may be an additive manufactured part, such as being 3D printed. The bracket 150 may be a stamped and formed metal part in other various embodiments.

The bracket 150 has a front 160 and a rear 162. The rear 162 is configured to be coupled to the base 110. The bracket 150 includes a top 164 and a bottom 166. The bracket 150 includes opposite sides 170, 172 extending between the top 164 and the bottom 166. Optionally, the bracket 150 may include a continuous side wall 168 extending along the sides 170, 172 and the front 160. The side wall 168 may have a curvature, such as being concave between the top 164 and the bottom 166. The top 164 and/or the bottom 166 may be generally flat or planar. In other embodiments, the top 164 and/or the bottom 166 may be curved, such as having a convex shape. The bracket 150 may be open at the rear 162 between the sides 170, 172, such as to receive the base 110. Optionally, the top 164 and/or the bottom 166, at the rear 162, may be shaped to conform to the vertical mounting base 50 (for example, the pole 20). For example, at the rear 162, at the top 164 and the bottom 166, may be curved, such as having a radius of curvature to match the radius of curvature of the pole 20.

In an exemplary embodiment, the bracket 150 includes one or more mounting hubs 174 for mounting the sensor(s) 200 to the bracket 150. In the illustrated embodiment, the mounting hubs 174 are provided at the top 164 and the bottom 166. Other locations are possible in alternative embodiments. Greater or fewer mounting hubs 174 may be provided in alternative embodiments. Optionally, multiple mounting hubs 174 may be provided on the same wall of the bracket 150, such as the top 164 and/or the bottom 166. In various embodiments, the mounting hubs 174 may extend from or stand proud of the corresponding wall of the bracket 150. In other embodiments, the mounting hubs 174 may extend into or be recessed into the corresponding wall of the bracket 150. In an exemplary embodiment, the mounting hub 174 is circular. The sensor 200 is configured to be rotatably coupled to the mounting hub 174. For example, the mounting hub 174 may include threads or a bayonet style connection element for connecting the sensor 200 to the mounting hub 174. The mounting hub 174 may have other shapes in alternative embodiments. The sensor 200 may be secured to the mounting hub 174 by other means in alternative embodiments, such as using latches, clips, fasteners, and the like.

In various embodiments, each mounting hub 174 is a mechanical connection point for connecting the sensor 200 to the bracket 150. The mounting hub 174 includes an opening 176 to allow sensor wires or other components to pass through the mounting hub 174. However, in alternative embodiments, the mounting hub 174 includes an electrical connector, such as a twist lock electrical connector. The electrical connector includes contacts or wireless transmitters to transfer data and/or power between the bracket 150 and the sensor 200.

In an exemplary embodiment, each sensor 200 is configured to be removably coupled to the corresponding mounting hub 174. The sensor 200 is used to monitor an environmental characteristic around the light fixture control module 100. For example, the sensor 200 may be used to monitor an amount of ambient light around the light fixture control module 100 to control turning the light fixture 10 on and off, such as at dusk and dawn. The sensor 200 may be used to detect motion around the light fixture control module 100, such as to brighten the light fixture 10 when motion is detected. The sensor may be used to detect audible sounds, such as an alarm, to flicker or strobe during an emergency situation. Other types of sensors may be provided in alternative embodiments.

In an exemplary embodiment, each sensor includes a sensor hub 202 configured to be mounted to the mounting hub 174. In various embodiments, a sensor seal may be provided between the sensor 200 and the bracket 150, such as to seal at the sensor hub 202 and the mounting hub 174. The sensor hub 202 may be threaded or include a bayonet style connecting element. In alternative embodiments, the sensor hub 202 may include latches, clips or include an opening configured to receive a fastener. The sensor 200 includes a sensor cover 204 enclosing a space. The sensor 200 includes a sensor element 210 located in the space and surrounded by the sensor cover 204. Various types of sensor elements may be utilized. For example, the sensor element 210 may be a photodetector, a motion detector, a sound detector, a gas detector, or another type of detector. Optionally, the sensor 200 may include multiple sensor elements 210. The sensor 200 includes one or more sensor wires 220 coupled to the sensor element 210. Signals, based on input from the sensor element 210, may be transmitted along the sensor wires 220, such as to the control panel 40 (shown in FIG. 1) of the light fixture 10. In various embodiments, the sensor wires 220 are directly couple to the sensor element 210. In other various embodiments, the sensor 200 may include a circuit board 230 or other electronic components with the sensor element 210 and the sensor wires 220 coupled to the circuit board 230. The circuit board 230 may process the signals from the sensor element 210 prior to transmitting signals on the sensor wires 220. For example, the circuit board 230 may generate control signals transmitted along the sensor wires 220 to the control panel 40.

In the illustrated embodiment, the sensors 200 include an upper sensor 200*a* and a lower sensor 200*b*. The upper sensor 200*a* may be a photosensor used to detect ambient light around the light fixture control module 100. The lower sensor 200*b* may be a motion detector used to detect motion around the light fixture control module 100. The upper sensor 200*a* and/or the lower sensor 200*b* may be other types of detectors in alternative embodiments.

Figure 4:
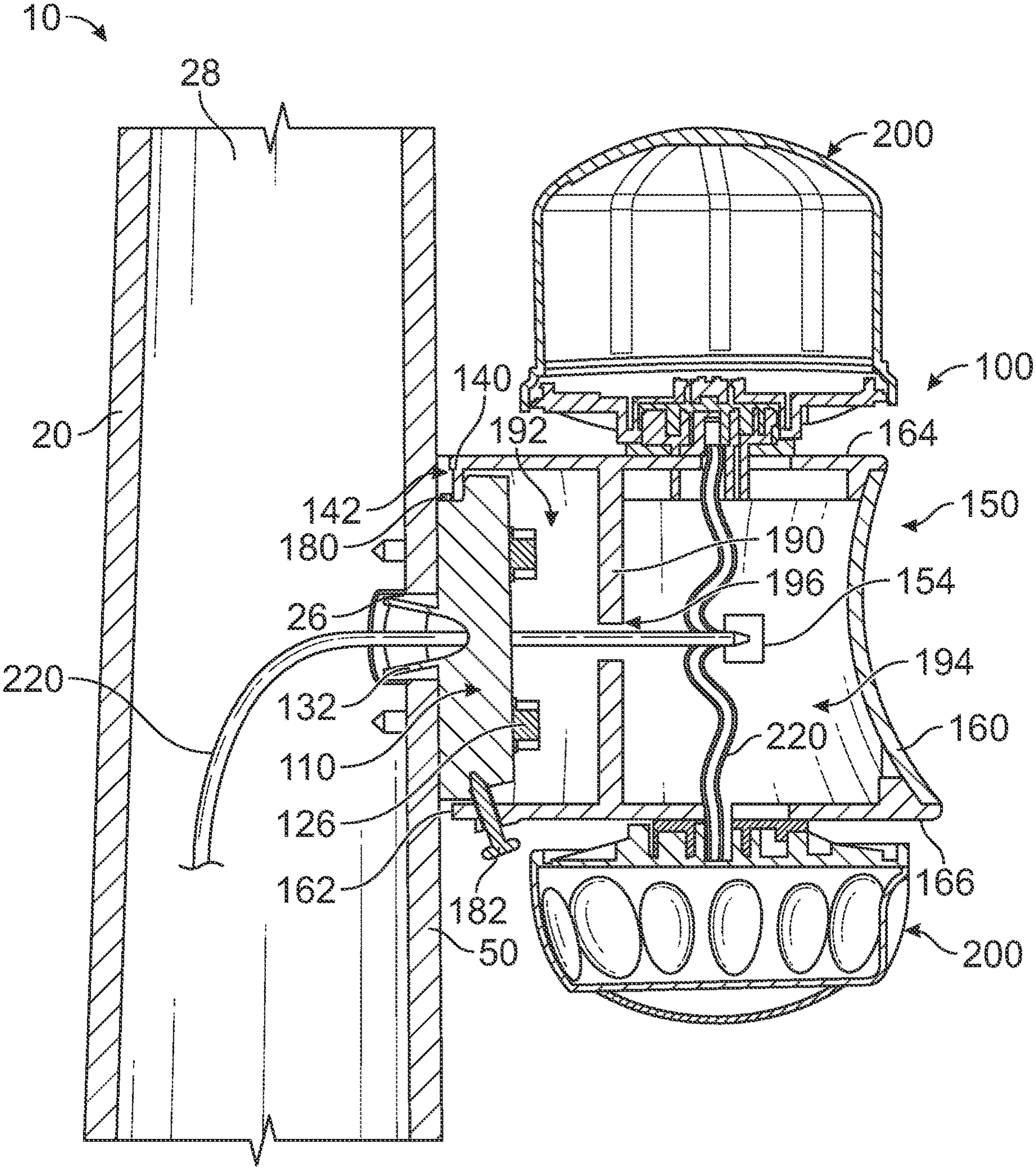
FIG. 4 is a cross-sectional view of the light fixture control module showing the light fixture control module mounted to the vertical mounting base of the light fixture in accordance with embodiments herein.

FIG. 4 is a cross-sectional view of the light fixture control module 100 showing the light fixture control module 100 mounted to the vertical mounting base 50 of the light fixture 10. In the illustrated embodiment, the vertical mounting base 50 is defined by the pole 20 of the light fixture 10. The light fixture control module 100 extends along the sides of the pole 20. The light fixture control module 100 is connected to the pole 20 from the exterior of the pole 20.

The base 110 is mounted to the vertical mounting base 50 using the mounting elements 126. In the illustrated embodiment, the mounting elements 126 are threaded fasteners. The threaded fasteners may be screwed directly into the pole 20. In an exemplary embodiment, the grommet 132 passes through an opening 26 in the vertical mounting base 50. The opening 26 may be formed by drilling a hole in the side of the pole 20. The grommet 132 extends into a hollow interior 28 of the pole 20.

The bracket 150 is coupled to the base 110. In an exemplary embodiment, the bracket 150 includes a retention tab 180 extending into the inner chamber 154. The retention tab 180 is received in the pocket 142. The retention tab 180 interfaces with the retention shoulder 140 to secure the bracket 150 to the base 110. In an exemplary embodiment, the retention tab 180 is configured to be pivotably coupled to the retention shoulder 140 in the pocket 142. For example, the retention tab 180 may pivoted in the pocket 142 during mounting of the bracket 150 to the base 110. In the illustrated embodiment, the retention tab 180 is provided at the top 164 of the bracket 150. Other locations are possible in alternative embodiments. In an exemplary embodiment, the bottom 166 of the bracket 150 is secured to the base 110 using a securing member 182. The securing member 182 may be a threaded fastener, such as a screw. Other securing means may be used in alternative embodiments, such as latches, clips, and the like.

In an exemplary embodiment, the bracket 150 includes a separating wall 190 in the inner chamber 154. The separating wall 190 divides the inner chamber 154 into a mounting cavity 192 and a wire cavity 194. In the illustrated embodiment, the mounting cavity 192 is provided at the rear 162 and the wire cavity 194 is provided at the front 160. The mounting cavity 192 receives the base 110. For example, the mounting cavity 192 may be sized and shaped to surround the base 110. The wire cavity 194 receives the sensor wires 220. The wire cavity 194 may receive portions of the sensors 200. The wire cavity 194 may be large enough to accommodate pigtail connections, such as between the sensor wires 220 extending from the sensors 200 and an additional wires configured to be routed into the hollow interior 28 of the pole 20. In an exemplary embodiment, the separating wall 190 includes an opening 196 to allow the sensor wires 220 to pass through the separating wall 190. Additional separating walls 190 may be provided in alternative embodiments to form additional cavities.

Figure 5:
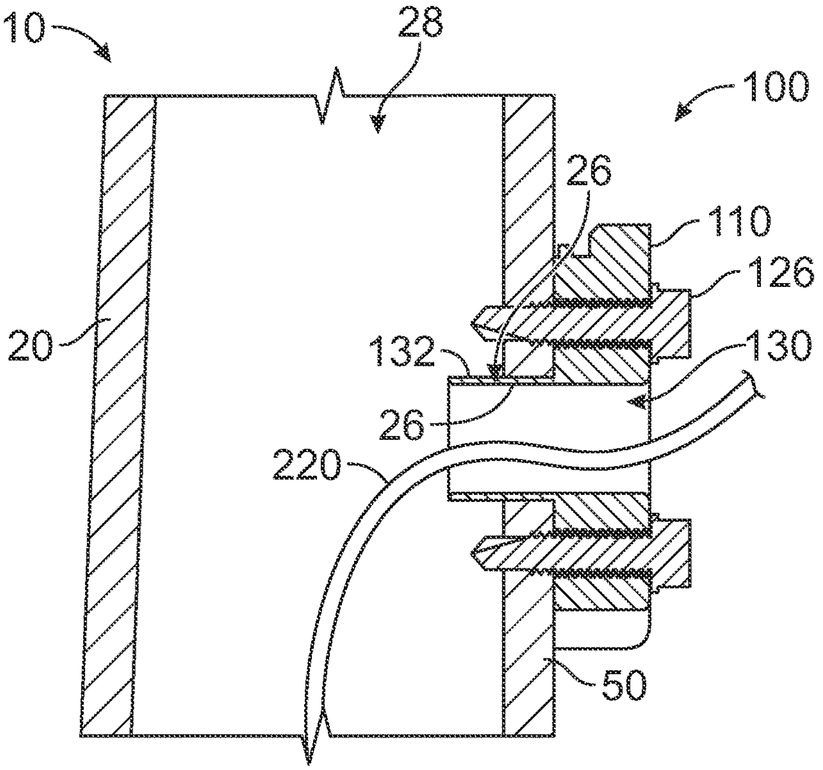
FIG. 5 is a cross-sectional view of the light fixture control module showing the base mounted to the vertical mounting base of the light fixture in accordance with embodiments herein.

FIG. 5 is a cross-sectional view of the light fixture control module 100 showing the base 110 mounted to the vertical mounting base 50 of the light fixture 10. The base 110 is mounted to the vertical mounting base 50 using the mounting elements 126 (for example, threaded fasteners). The grommet 132 passes through the opening 26 in the vertical mounting base 50. The sensor wires 220 pass through the wire channel 130. The wire channel 130 extends through the grommet 132 to allow the sensor wires 220 to be routed into the hollow interior 28 of the pole 20. In an exemplary embodiment, the distal end of the grommet 132 is located away from the side wall of the pole 20 in the hollow interior 28 of the pole 20. The grommet 132 is used to protect the sensor wires 220, such as to prevent cutting or slicing of the sensor wire 220 at the sharp edge defining the opening 26. The distal end of the grommet 132 may have a smooth edge to prevent cutting of the sensor wires 220. For example, the grommet 132 may be chamfered or curved at the distal end of the grommet 132.

Figure 6:
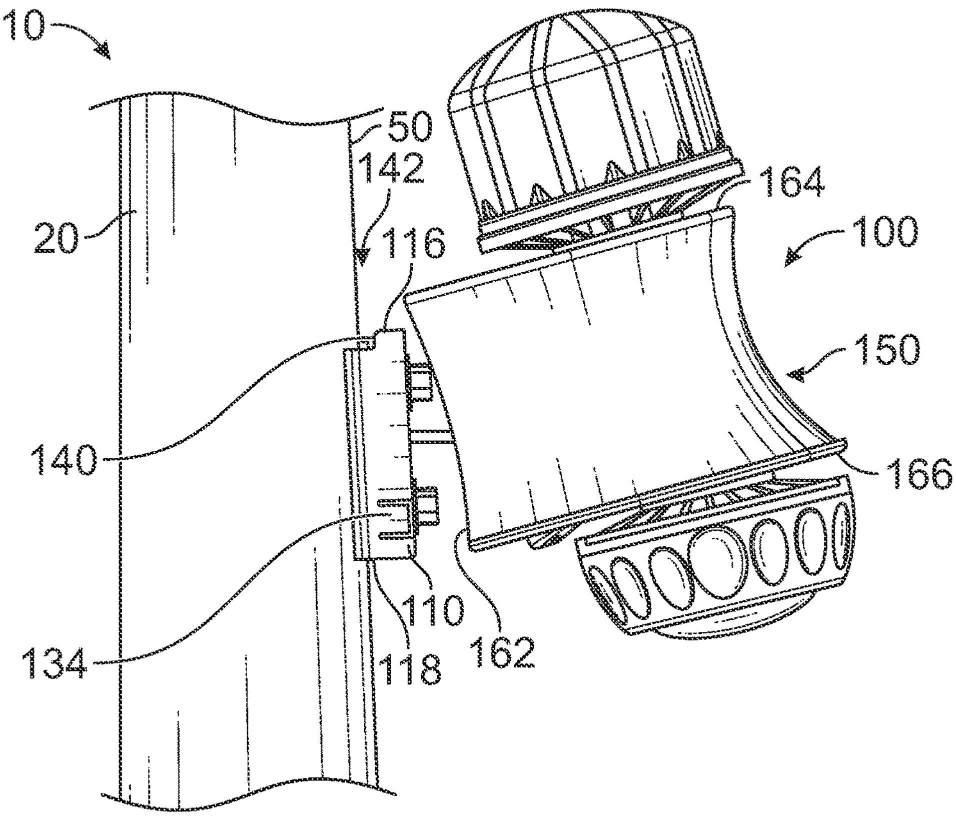
FIG. 6 is a side view of the light fixture control module showing the bracket poised for mounting to the base in accordance with embodiments herein.

FIG. 6 is a side view of the light fixture control module 100 showing the bracket 150 poised for mounting to the base 110. The base 110 is shown coupled to the vertical mounting base 50 of the light fixture 10. In an exemplary embodiment, the base 110 forms a pivot mount for mounting the bracket 150 to the vertical mounting base 50. During assembly, the retention tab 180 at the top 164 of the bracket 150 is loaded over the top 116 of the base 110 into the pocket 142. The bracket 150 is held at an angle during assembly and loading of the retention tab 180 into the pocket 142. Once the retention tab 180 is received in the pocket 142, the bottom

166 of the bracket 150 may be pivoted inward toward the pole 20 to seat the rear 162 of the bracket 150 on the base 110 and/or the pole 20. In an exemplary embodiment, the base 110 includes the latching features 134 at the bottom 118 of the base 110, which are used to latchably secure the bottom 166 of the bracket 150 to the base 110. Other mounting schemes may be used in alternative embodiments to mount the bracket 150 to the base 110.

Figure 7:
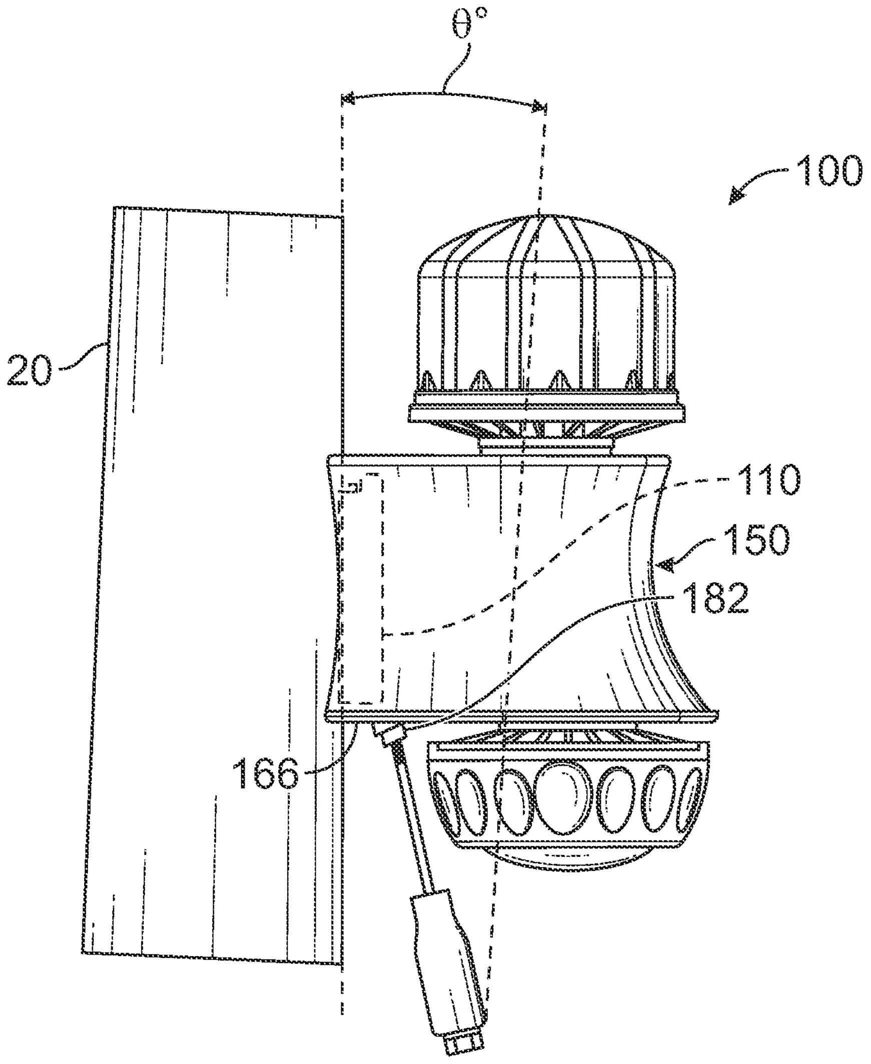
FIG. 7 is a side view of the light fixture control module showing the bracket mounted to the base in accordance with embodiments herein.

FIG. 7 is a side view of the light fixture control module 100 showing the bracket 150 mounted to the base 110. In an exemplary embodiment, the bracket 150 includes a leveling feature to allow leveling of the bracket 150 relative to the base 110 and the pole 20. For example, when the pole 20 is tapered, the side wall of the pole 20 is at an angle relative to vertical. The leveling feature of the bracket 150 allows mounting of the bracket 150 horizontally to the tapered pole 20. In an exemplary embodiment, the securing member 182 is used as a leveling feature. For example, the securing member 182 is configured to be coupled to the base 110 at different mounting positions to control a mounting orientation (for example, angle) of the bracket 150 relative to the base 110 at one of various different mounting orientations corresponding to the different mounting positions. For example, the bottom 166 of the bracket 150 may be pivoted toward the pole 20 or away from the pole 20 until the bracket 150 is at the desired mounting orientation (for example, horizontal or level). The securing member 182 is connected to the base 110 when the bracket 150 is at the desired mounting orientation. For example, the securing member 182 may be screwed into the base 110 at the mounting position corresponding to the desired mounting orientation.

Figure 8:
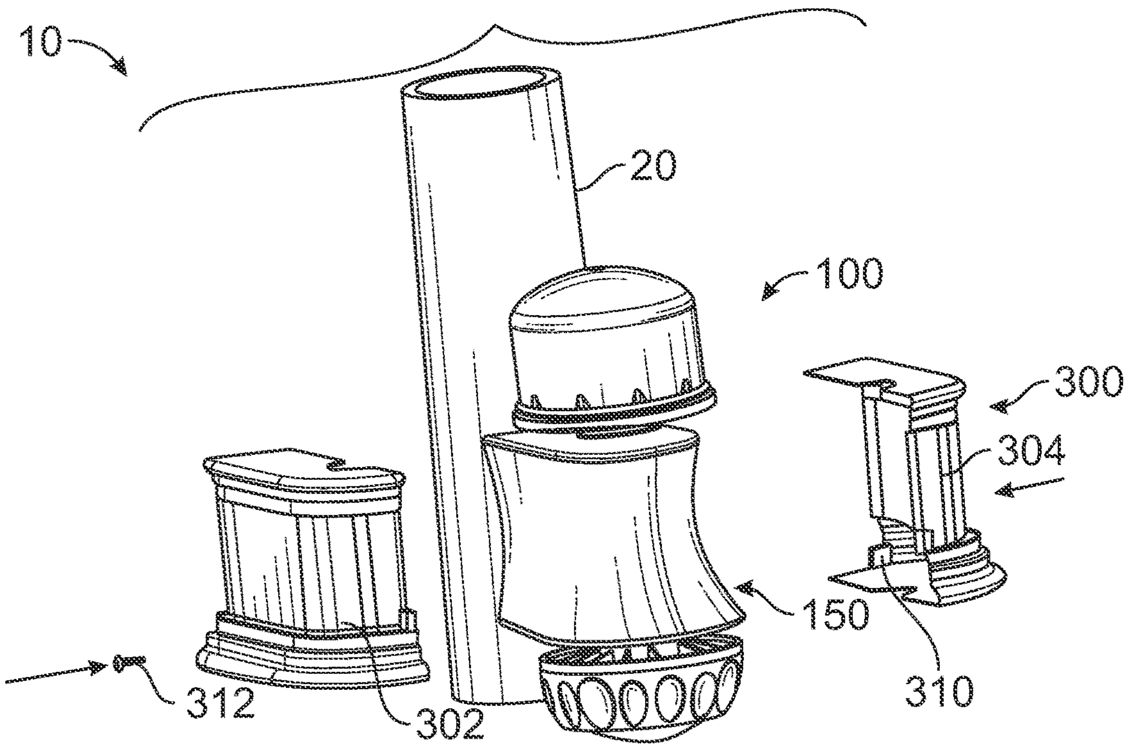
FIG. 8 is an exploded view of the light fixture control module in accordance with an exemplary embodiment.
Figure 9:
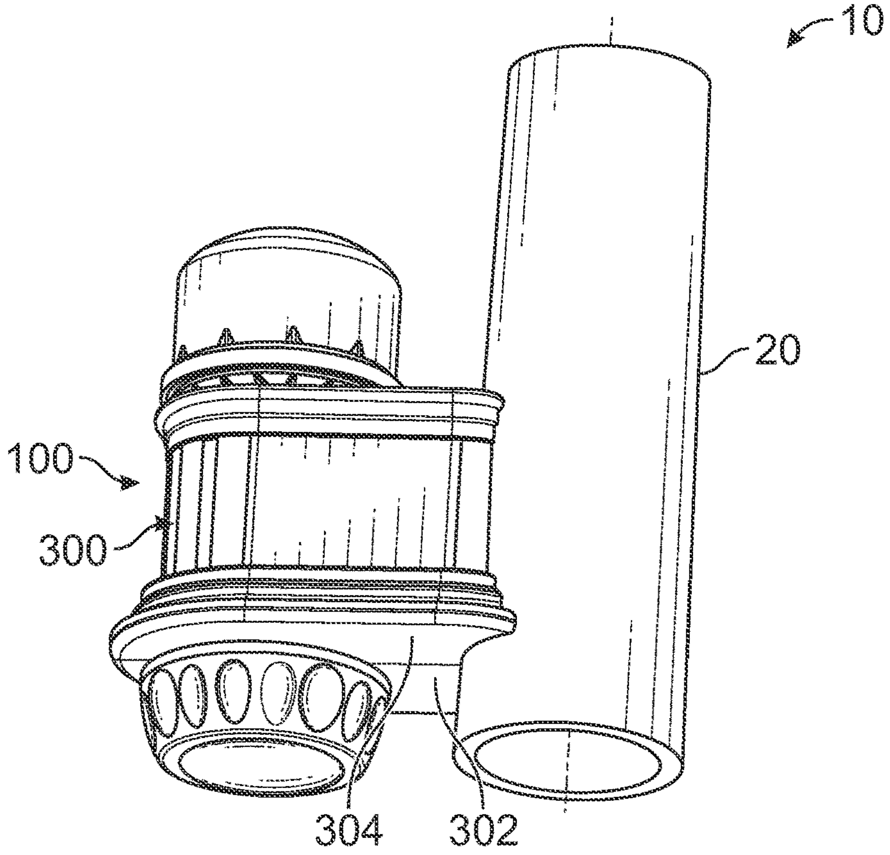
FIG. 9 is an assembled view of the light fixture control module in accordance with an exemplary embodiment.

FIG. 8 is an exploded view of the light fixture control module 100 in accordance with an exemplary embodiment. FIG. 9 is an assembled view of the light fixture control module 100 in accordance with an exemplary embodiment. FIGS. 8 and 9 illustrate a decorative cover 300 configured to be coupled to the bracket 150. In the illustrated embodiment, the decorative cover 300 is a multipiece structure including a first portion 302 configured to be joined to a second portion 304. Optionally, the first and second portions 302, 304 may be mirrored halves. The first portion 302 is provided at the right side of the bracket 150 and the second portion 304 is provided at the left side of the bracket 150. The decorative cover 300 forms a skin surrounding the bracket 150. The decorative cover 300 includes decorative features to provide visual appeal for the light fixture control module 100, which may be complementary to the style of the light fixture 10.

The decorative cover 300 includes a mounting tab 310, which may be coupled to the bracket 150 to position the decorative cover 300 relative to the bracket 150. The mounting tabs 310 may be located at the rear of the decorative cover 300 and configured to be located between the bracket 150 and the pole 20. The decorative cover 300 includes a fastener 312 used to secure the first portion 302 and the second portion 304. Optionally, the rear of the decorative cover 300 may closely match the curvature of the pole 20 to reduce or eliminate gaps between the decorative cover 300 and the pole 20 for a clean finished look.

Figure 10:
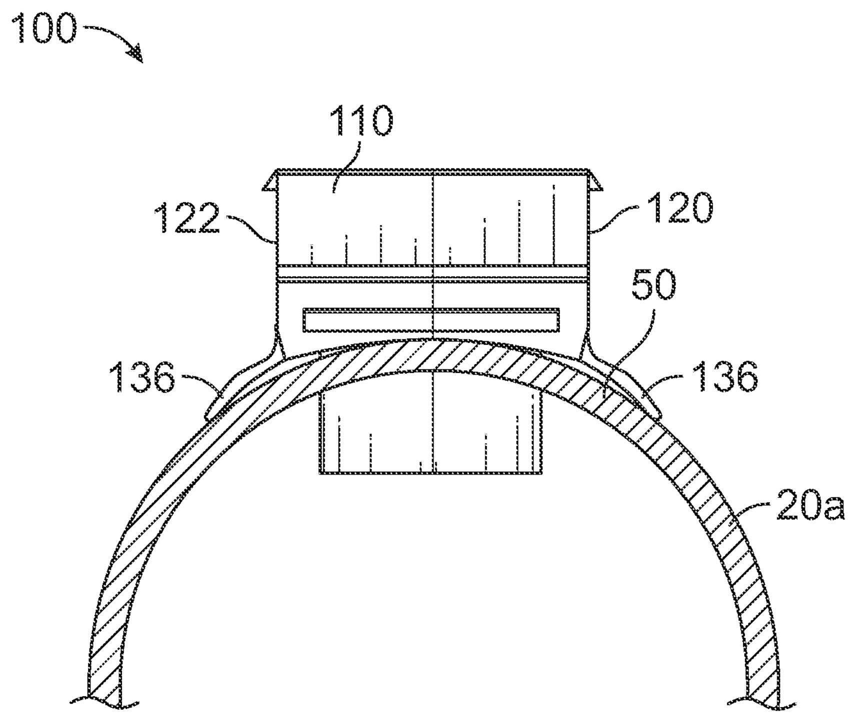
FIG. 10 is a top view of the base of the light fixture control module mounted to the pole in accordance with an exemplary embodiment.
Figure 11:
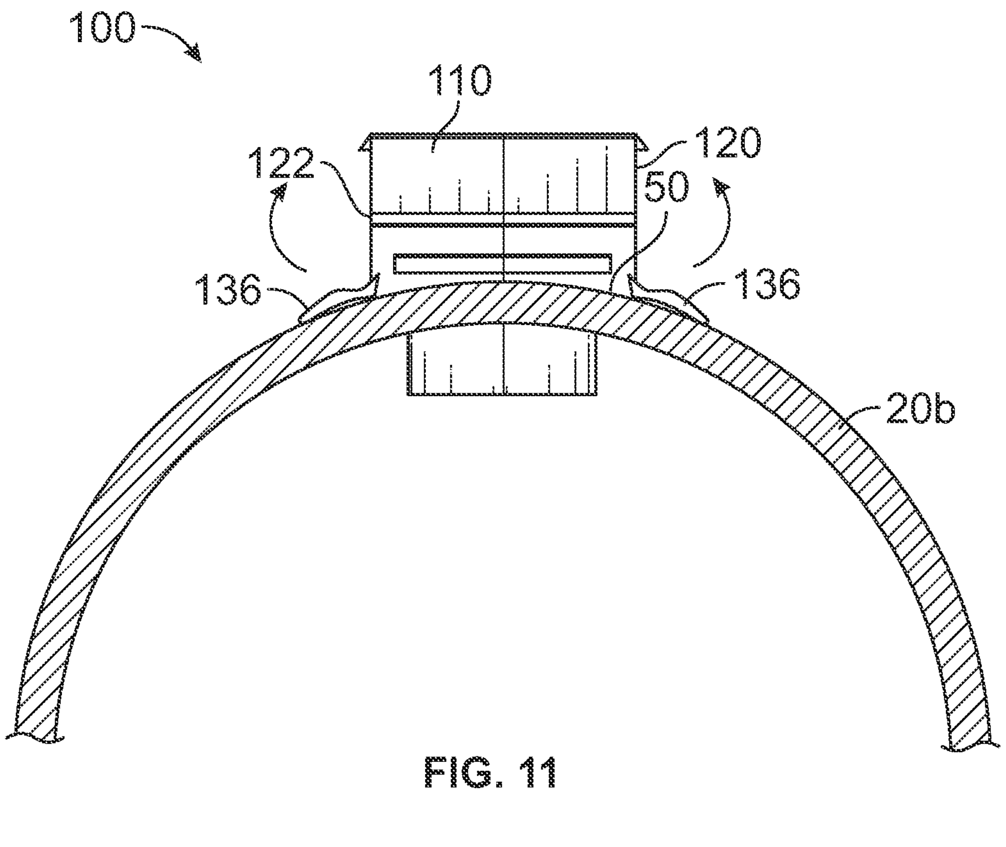
FIG. 11 is a top view of the base of the light fixture control module mounted to the pole in accordance with an exemplary embodiment.

FIG. 10 is a top view of the base 110 of the light fixture control module 100 mounted to the pole 20*a* in accordance with an exemplary embodiment. FIG. 11 is a top view of the base 110 of the light fixture control module 100 mounted to the pole 20*b* in accordance with an exemplary embodiment. The pole 20*a* shown in FIG. 10 is a smaller diameter compared to the pole 20*b* shown in FIG. 11. The same base 110 may be mounted to the different diameter poles 20*a*, 20*b*.

In an exemplary embodiment, the base 110 includes the mounting flanges 136 along the sides 120, 122. The mounting flanges 136 interface with the poles 20*a*, 20*b* (for example, the vertical mounting base 50). The mounting flanges 136 are deflectable to change shape and to conform to the shape of the pole 20*a*, 20*b*. For example, the mounting flanges 136 may be flexed outward when the base 110 is mounted to the vertical mounting base 50. The mounting flanges 136 conform to the different radius of curvature of the different poles 20*a*, 20*b* to allow mounting of the base 110 to the different diameter poles 20*a*, 20*b*.

Figure 12:
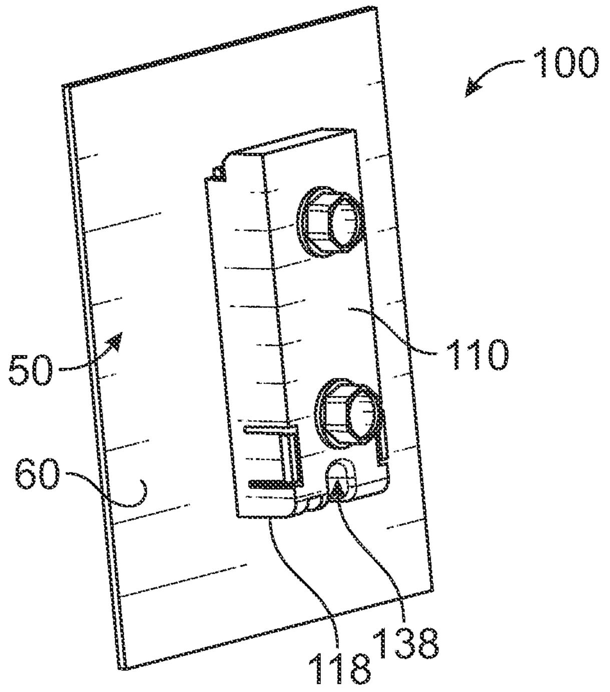
FIG. 12 is a front perspective view of the base of the light fixture control module mounted to the vertical mounting base in accordance with an exemplary embodiment.
Figure 13:
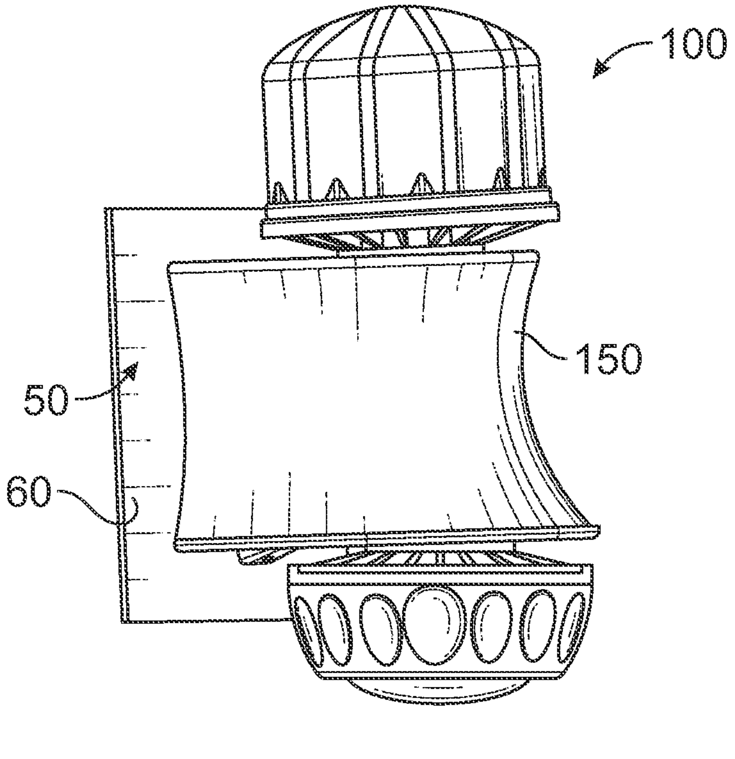
FIG. 13 is a front perspective view of the light fixture control module mounted to the vertical mounting base in accordance with an exemplary embodiment.

FIG. 12 is a front perspective view of the base 110 of the light fixture control module 100 mounted to the vertical mounting base 50 in accordance with an exemplary embodiment. FIG. 13 is a front perspective view of the light fixture control module 100 mounted to the vertical mounting base 50 in accordance with an exemplary embodiment. The vertical mounting base 50 shown in FIGS. 12 and 13 is planar or flat rather than being the cylindrical pole 20 (shown in FIG. 1). The vertical mounting base 50 includes a mounting plate 60, which may be mounted to the side of a building. The mounting plate 60 is planar. Optionally, the sensor wires 220 may be routed into the interior of the building through the vertical mounting base 50. Alternatively, the sensor wires 220 may be routed along the exterior of the building by exiting the base 110 through an opening 138 at the bottom 118.

Figure 14:
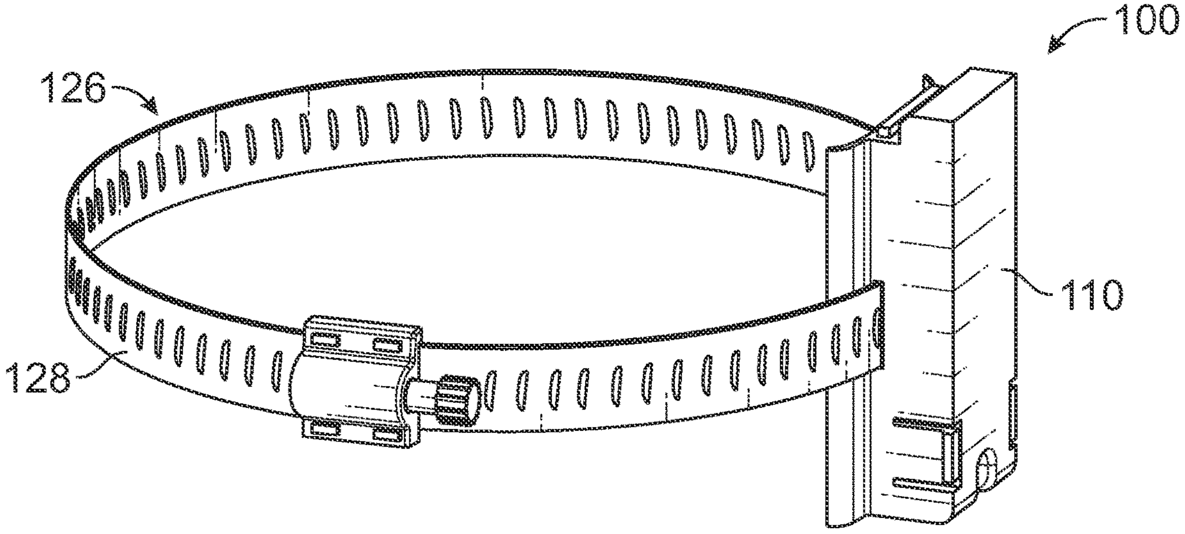
FIG. 14 is a front perspective view of the base of the light fixture control module in accordance with an exemplary embodiment.
Figure 15:
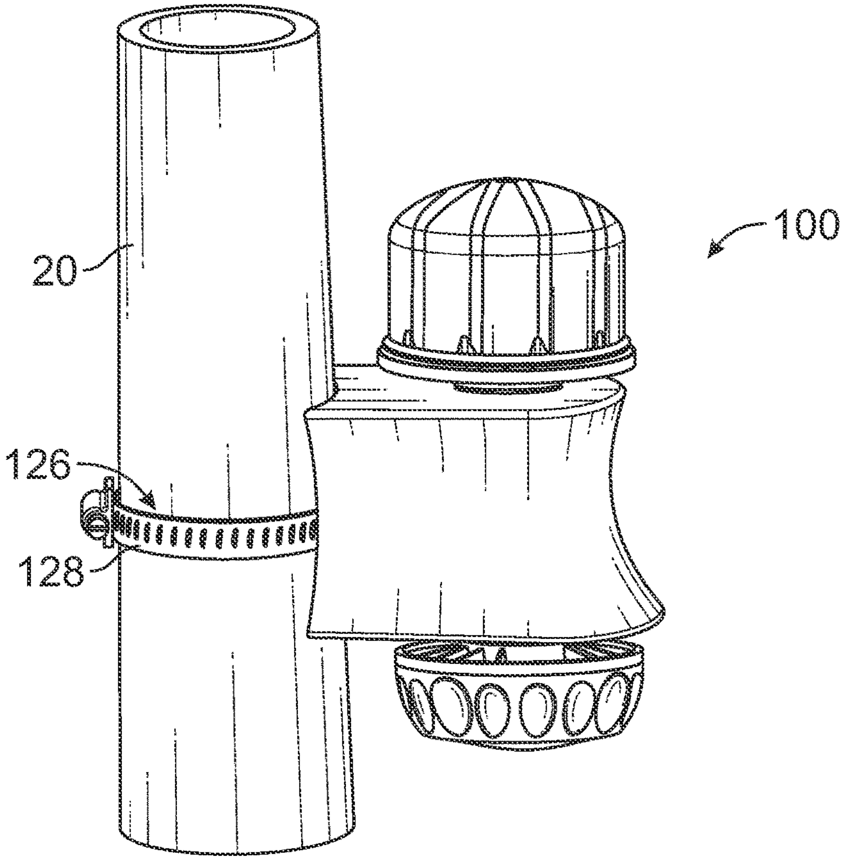
FIG. 15 is a perspective view of the light fixture control module mounted to the pole in accordance with an exemplary embodiment.

FIG. 14 is a front perspective view of the base 110 of the light fixture control module 100 in accordance with an exemplary embodiment. FIG. 15 is a perspective view of the light fixture control module 100 mounted to the pole 20 in accordance with an exemplary embodiment. FIGS. 14 and 15 illustrate the mounting element 126 of the base 110 including a band clamp 128 configured to be wrapped around the pole 20 and tightened to secure the base 110 to the pole 20. The band clamp 128 may include a worm drive to tighten the band clamp 128.

Figure 16:
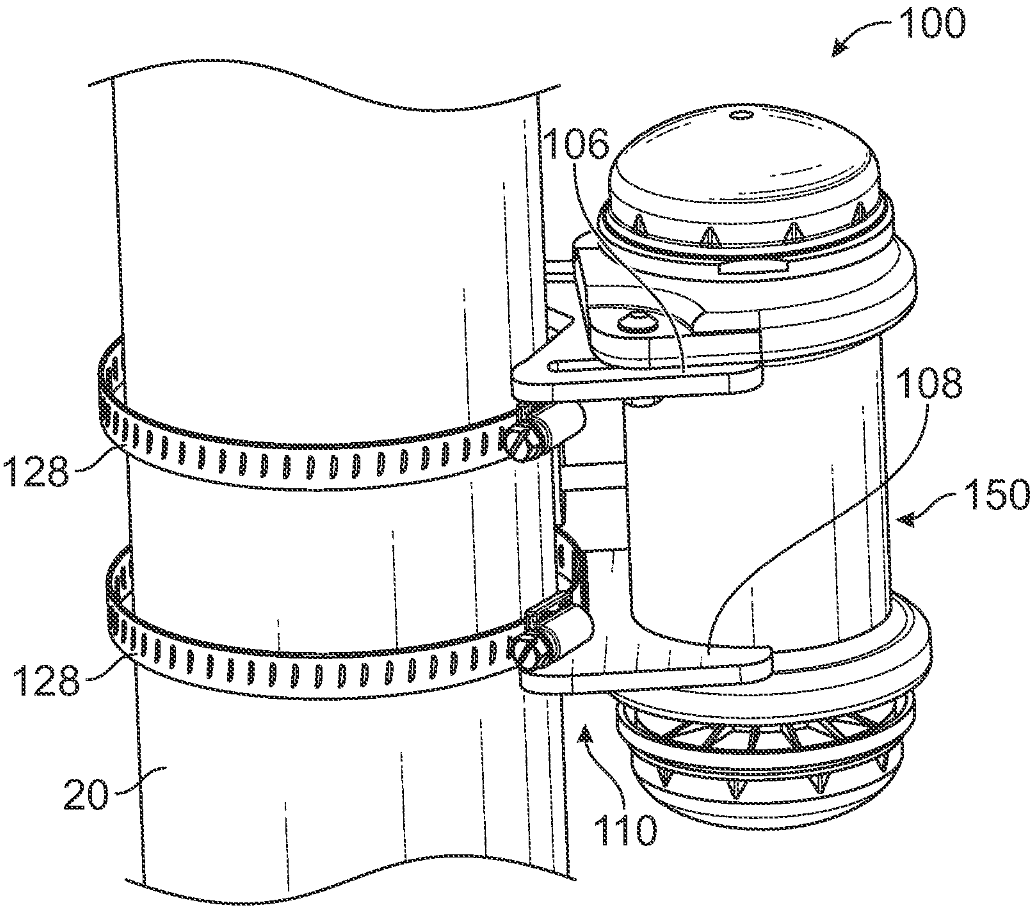
FIG. 16 is a perspective view of the light fixture control module mounted to the pole in accordance with an exemplary embodiment.

FIG. 16 is a perspective view of the light fixture control module 100 mounted to the pole 20 in accordance with an exemplary embodiment. In the illustrated embodiment, the base 110 includes a pair of the band clamps 128. In the illustrated embodiment, the base 110 is a multipiece base having an upper base support 106 and a lower base support 108 separate and discrete from each other and mounted to the pole 20 using the corresponding band clamps 128. The upper base support 106 supports the top of the bracket 150. The lower base support 108 supports the bottom of the bracket 150. The bracket 150 is shaped differently, such as being an enclosed canister. The base 110 and/or the bracket 150 may have other shapes or sizes in alternative embodiments.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A light fixture control module comprising:

a base including an inner end and an outer end, the inner end being mounted to a vertical mounting base of a light fixture, the base including a mounting flange coupled to the vertical mounting base, the base including a wire channel;

a bracket coupled to the outer end of the base, the bracket including a shell having an inner chamber; and a sensor mounted to the shell of the bracket, the sensor having a sensor element and a sensor wire transmitting a control signal from the sensor element, the sensor wire being routed through the inner chamber of the shell to the wire channel of the base, the sensor wire configured to be routed away from the base to control operation of a light element of the light fixture.

2. The light fixture control module of claim 1, wherein the base includes a grommet extending from the inner end, the wire channel passing through the grommet.

3. The light fixture control module of claim 1, wherein the base includes a grommet extending from the inner end, the grommet is configured to pass through an opening in the vertical mounting base to access an interior of the vertical mounting base for the sensor wire.

4. The light fixture control module of claim 1, wherein the base includes a retention shoulder defining a pocket, the bracket including a retention tab received in the pocket and engaging the retention shoulder to couple the bracket to the base.

5. The light fixture control module of claim 1, wherein the bracket is pivotably coupled to the base.

6. The light fixture control module of claim 1, wherein the base includes a latching feature and the bracket includes a latching feature engaging the latching feature of the base to secure the bracket to the base, at least one of the latching features being releasable to allow removal of the bracket from the base.

7. The light fixture control module of claim 1, wherein the bracket includes a securing member configured to be coupled to the base at different mounting positions to control a mounting orientation of the bracket relative to the base at one of various different mounting orientations corresponding to the different mounting positions.

8. The light fixture control module of claim 1, further comprising fasteners configured to secure the base to the vertical mounting base.

9. The light fixture control module of claim 1, further comprising a band configured to wrap around the vertical mounting base to secure the base to the vertical mounting base.

10. The light fixture control module of claim 1, wherein the inner end of the base is curved to fit to a curved surface of the vertical mounting base.

11. The light fixture control module of claim 1, wherein the mounting flange is flexible to mate to different shaped vertical mounting bases.

12. The light fixture control module of claim 1, wherein the bracket includes a separating wall dividing the inner chamber into a mounting cavity and a wire cavity, the mounting cavity receiving the base, the sensor wire extending from the sensor into the wire cavity, the separating wall including an opening configured to receive the sensor wire.

13. The light fixture control module of claim 1, wherein the bracket includes a mounting hub, the sensor being coupled to the mounting hub.

14. The light fixture control module of claim 13, wherein the sensor is rotatably coupled to the mounting hub.

15. The light fixture control module of claim 1, wherein the bracket includes a sensor connector, the sensor being coupled to the sensor connector, the sensor wire extending from the sensor connector into the inner chamber.

16. The light fixture control module of claim 1, further comprising a sensor seal between the sensor and the bracket.

17. The light fixture control module of claim 1, further comprising a base seal between the base and the bracket.

18. The light fixture control module of claim 1, wherein the sensor is a first sensor, the light fixture control module further comprising a second sensor.

19. The light fixture control module of claim 18, wherein the first sensor is coupled to a top of the bracket and the second sensor is coupled to a bottom of the bracket.

20. The light fixture control module of claim 18, wherein the sensor element of the first sensor is a photo sensor element and wherein the sensor element of the second sensor is a motion sensor element.

21. The light fixture control module of claim 1, wherein the inner end of the base is planar for mating to a planar vertical mounting base.

22. The light fixture control module of claim 1, further comprising a decorative cover coupled to the bracket.

23. The light fixture control module of claim 22, wherein the decorative cover completely surrounds the shell of the bracket.

24. A light fixture control module comprising:

a base including an inner end and an outer end, the inner end being mounted to a vertical mounting base of a light fixture, the base including a wire channel;

a bracket coupled to the outer end of the base, the bracket including a shell having an inner chamber, the bracket including a first mounting surface and a second mounting surface;

a first sensor mounted to the first mounting surface of the shell, the first sensor having a first sensor element and a first sensor wire transmitting a first control signal from the first sensor element, the first sensor wire being routed through the inner chamber of the shell to the wire channel of the base, the first sensor wire configured to be routed away from the base to control operation of a light element of the light fixture; and a second sensor mounted to the second mounting surface of the shell, the second sensor having a second sensor element and a second sensor wire transmitting a second control signal from the second sensor element, the second sensor wire being routed through the inner chamber of the shell to the wire channel of the base, the second sensor wire configured to be routed away from the base to control operation of a light element of the light fixture.

25. The light fixture control module of claim 24, wherein the first sensor is coupled to a top of the bracket and the second sensor is coupled to a bottom of the bracket.

26. The light fixture control module of claim 24, wherein the first sensor element is a photo sensor element and wherein the second sensor element is a motion sensor element.

27. A light fixture control module comprising:

a base including an inner end and an outer end, the inner end being mounted to a vertical mounting base of a light fixture, the base including a wire channel;

a bracket pivotably coupled to the outer end of the base, the bracket including a shell having an inner chamber, the bracket including a securing member configured to be coupled to the base at different mounting positions to control a mounting orientation of the bracket relative to the base at one of various different mounting orientations corresponding to the different mounting positions; and a sensor mounted to the shell of the bracket, the sensor having a sensor element and a sensor wire transmitting a control signal from the sensor element, the sensor wire being routed through the inner chamber of the shell to the wire channel of the base, the sensor wire configured to be routed away from the base to control operation of a light element of the light fixture.

28. The light fixture control module of claim 27, wherein the base includes a mounting flange, the mounting flange coupled to the vertical mounting base.

* * * * *